US007412205B2

(12) United States Patent
Järvi et al.

(10) Patent No.: US 7,412,205 B2
(45) Date of Patent: *Aug. 12, 2008

(54) TWO CHANNEL COMMUNICATION SYSTEM USING RDS DATASTREAM BROADCASTING

(75) Inventors: Jyrki Järvi, Helsinki (FI); Jukka Nihtilä, Espoo (FI)

(73) Assignee: Nokia Corporation, Espoo (FI)

( * ) Notice: Subject to any disclaimer, the term of this patent is extended or adjusted under 35 U.S.C. 154(b) by 9 days.

This patent is subject to a terminal disclaimer.

(21) Appl. No.: 11/248,324

(22) Filed: Oct. 13, 2005

(65) Prior Publication Data

US 2006/0030378 A1 Feb. 9, 2006

Related U.S. Application Data

(63) Continuation of application No. 09/969,864, filed on Oct. 4, 2001.

(51) Int. Cl.
*H04Q 7/20* (2006.01)

(52) U.S. Cl. .................... 455/3.04; 455/3.05; 455/3.06; 455/456.3; 455/557; 705/26

(58) Field of Classification Search ................. 455/427, 455/553, 557, 3.04, 3.06, 456.3, 3.01; 370/351; 705/26
See application file for complete search history.

(56) References Cited

U.S. PATENT DOCUMENTS

| | | | | |
|---|---|---|---|---|
| 5,303,393 | A | 4/1994 | Noreen et al. | |
| 5,539,635 | A | 7/1996 | Larson, Jr. | |
| 5,548,828 | A * | 8/1996 | Kozaki et al. | 455/161.2 |
| 5,797,088 | A | 8/1998 | Stamegna | |
| 5,907,322 | A | 5/1999 | Kelly et al. | |
| 5,991,737 | A | 11/1999 | Chen | |
| 6,038,434 | A | 3/2000 | Miyake | |
| 6,131,042 | A | 10/2000 | Lee et al. | |
| 6,163,711 | A | 12/2000 | Juntunen et al. | |
| 6,246,672 | B1 | 6/2001 | Lumelsky | |
| 6,522,342 | B1 * | 2/2003 | Gagnon et al. | 715/716 |
| 6,539,212 | B1 | 3/2003 | Kamalski | |
| 6,678,501 | B1 | 1/2004 | Valeski | |
| 6,728,531 | B1 | 4/2004 | Lee et al. | |
| 6,975,835 | B1 * | 12/2005 | Lake et al. | 455/3.01 |

(Continued)

FOREIGN PATENT DOCUMENTS

| | | |
|---|---|---|
| DE | 4241 857 | 6/1994 |

(Continued)

*Primary Examiner*—Duc Nguyen
*Assistant Examiner*—Julio R Perez
(74) *Attorney, Agent, or Firm*—Banner & Witcoff Ltd.

(57) ABSTRACT

Aspects of the invention comprise a digital mobile terminal system for accessing mobile internet services including a VHF/AM/FM radio receiver and a subsystem that handles interfaces and interactions between the digital mobile terminal and a radio network via a digital (e.g., RDS) data stream, interfaces and interactions between the digital mobile terminal and a mobile internet services platform, and interfaces and interactions between the digital mobile terminal and a user seeking to access and interact with mobile internet services. The present invention also comprises a radio broadcasting server platform for transmitting an RDS data stream including a subsystem that handles interfaces and interaction between the radio broadcasting server platform and a radio network via the digital (e.g., RDS) data stream and interfaces and interactions between the radio broadcasting server platform and a mobile internet services platform.

28 Claims, 6 Drawing Sheets

U.S. PATENT DOCUMENTS

| | | | | |
|---|---|---|---|---|
| 7,158,753 | B2 * | 1/2007 | Kagan et al. | 455/3.04 |
| 2002/0183059 | A1 * | 12/2002 | Noreen et al. | 455/427 |

FOREIGN PATENT DOCUMENTS

| | | | |
|---|---|---|---|
| DE | 44 27 046 | | 2/1996 |
| DE | 195 02 922 | | 8/1996 |
| EP | 0 565 947 | | 5/1997 |
| GB | 2288951 | A | 11/1995 |
| WO | WO 97/21291 | | 6/1997 |
| WO | WO 97/33434 | | 9/1997 |
| WO | WO 98/15075 | | 4/1998 |
| WO | WO 99/04568 | | 1/1999 |
| WO | WO 99/35809 | | 7/1999 |
| WO | 9943109 | A | 8/1999 |
| WO | WO 00/46944 | | 8/2000 |
| WO | 0147237 | A2 | 6/2001 |

* cited by examiner

TWO CHANNEL COMMUNICATION SYSTEM USING RDS DATASTREAM BROADCASTING

CROSS-REFERENCE TO RELATED APPLICATIONS

This application is a continuation application of co-pending application Ser. No. 09/969,864, filed Oct. 4, 2001, and having the title "Two Channel Communication System Based on RDS Datastream Broadcasting and the Integration of Digital Mobile Terminal and VHF/FM Radio Receiver."

FIELD OF THE INVENTION

The present invention relates generally to the integration of digital mobile terminals with a radio broadcast transmission. Specifically, the present invention relates to a system and method for linking data to a digital mobile terminal in order to enable a user of a digital mobile terminal to interact with a back-end content provider's information base.

BACKGROUND OF THE INVENTION

Conventional access to back-end content provider information has been via a desktop computer connected to an Internet Service Provider (ISP) via a telephone line (either POTS or ISDN) or via a cable modem or other specialized wire-line media. Using such an arrangement, a user can, once connected to their ISP, access the World Wide Web (WWW) to request and display web pages and from these web pages further request and receive information (news, financial data, entertainment, weather, directions (maps), traffic, etc.) or actually order products and services (food, clothing, computers, household items, etc.). These products, services and information are provided by back-end content providers. There may or may not be a charge to connect to the web pages containing the information provided by the back-end service providers. News services such as Reuters may charge a fee in order to access the information that they provide. Other content providers do not charge but are hopeful that a user will purchase their products or services. Such an arrangement lacks mobility and portability.

FM radio stations broadcast audio signals that contain music, weather, traffic information, sports scores, news, advertising etc. Additionally, FM radio stations have an auxiliary or secondary digital sub-channel available that is used to broadcast a bit stream within the 87.5-108 MHz frequency band. This Radio Data Stream (RDS) data is silently delivered at a rate of approximately 1200-2400 bits per second (bps). Originally developed in Europe, RDS currently enables radio listeners to see the name of the radio station displayed, email addresses or phone numbers, have their clocks synchronized etc. on a relatively small alphanumeric display. This same display is used in vehicles to indicate whether the listener is listening to a cassette tape, a CD (number, track, play time, etc.) FM radio, AM radio, phone mute etc.

A traditional FM radio program or an advertisement during an FM radio broadcast is used to promote information to the audience. This information can be sent in the RDS, including e.g., a Web link, an email address, a phone number or other means to interact with another repository for further information or to procure products or services. This suffers from limitations of its own, such as the relatively small screen size that limits the applications. The screen size is for all practical purposes too small to display a Web site Uniform Resource Locator (URL) or a listing of URLs. Further, to date the means to use the information provided by an RDS data stream has been manual. That is, the user needed to memorize the fleeting information or write it down and manually connect to the corresponding services including mobile internet services. This makes the communication slow and cumbersome. If there is a substantial time delay, the content may lose its significance. For example, at some point in time and travel, it may be too late to select an alternative route in the event of a traffic problem based on preliminary information received from an RDS data stream. A time delay may cause the listener to lose an opportunity to order something that was offered for a limited time. That is, because of the time lag, the interaction with the corresponding services or mobile internet services does not take place and subsequently the service is not used and both the listener and the offeror lose the opportunity.

SUMMARY OF THE INVENTION

To overcome limitations in the prior art described above, and to overcome other limitations that will become apparent upon reading and understanding the description herein of the present invention, the present invention discloses a system, apparatus and method for communicating services to a digital mobile terminal operating within a wireless network. The wireless device is not limited to any preset navigation structure, and provides the ability to remotely access services.

In accordance with one embodiment of the present invention, the present invention contemplates a system and method for integrating a digital mobile terminal, such as a wireless phone, with an RDS signal transmitted over the auxiliary sub-carrier channel by an FM radio station. Specifically the present invention provides a system and method for linking an RDS stream of data to back-end content and transaction services using a digital mobile terminal. The RDS data stream can, for example, contain links to WAP-, SMS-, WWW-, and I-mode based value-added services, such as news, entertainment, and e-commerce. These and similar services are termed mobile internet services.

The present invention provides, therefore, an integrated system and method that combines a digital mobile terminal with back-end content providers via a digital data stream embedded in a radio broadcast such as the FM radio RDS system. The system and method include capturing and saving an RDS data stream, and using the saved RDS data stream to access back-end content via a hypertext link displayed on the screen of the digital mobile terminal. The system and method of the present invention also include definition of the subsystem that integrates an RDS data stream and the Short Message Service (SMS), World Wide Web (WWW) browser module and Wireless Application Protocol (WAP) interfaces of the digital mobile terminal including a memory/buffering scheme and the separate or integrated subsystem to initiate the connection and request the corresponding content, product or service.

BRIEF DESCRIPTION OF THE DRAWINGS

The invention is best described with reference to the detailed description and the following figure, where.

DETAILED DESCRIPTION OF THE PREFERRED EMBODIMENTS

In the following description of the various embodiments, reference is made to the accompanying drawings, which form a part hereof, and in which is shown by way of illustration various embodiments in which the invention may be practiced. It is to be understood that other embodiments may be utilized, and structural and functional modifications may be made without departing from the scope of the present invention.

Figure 1:
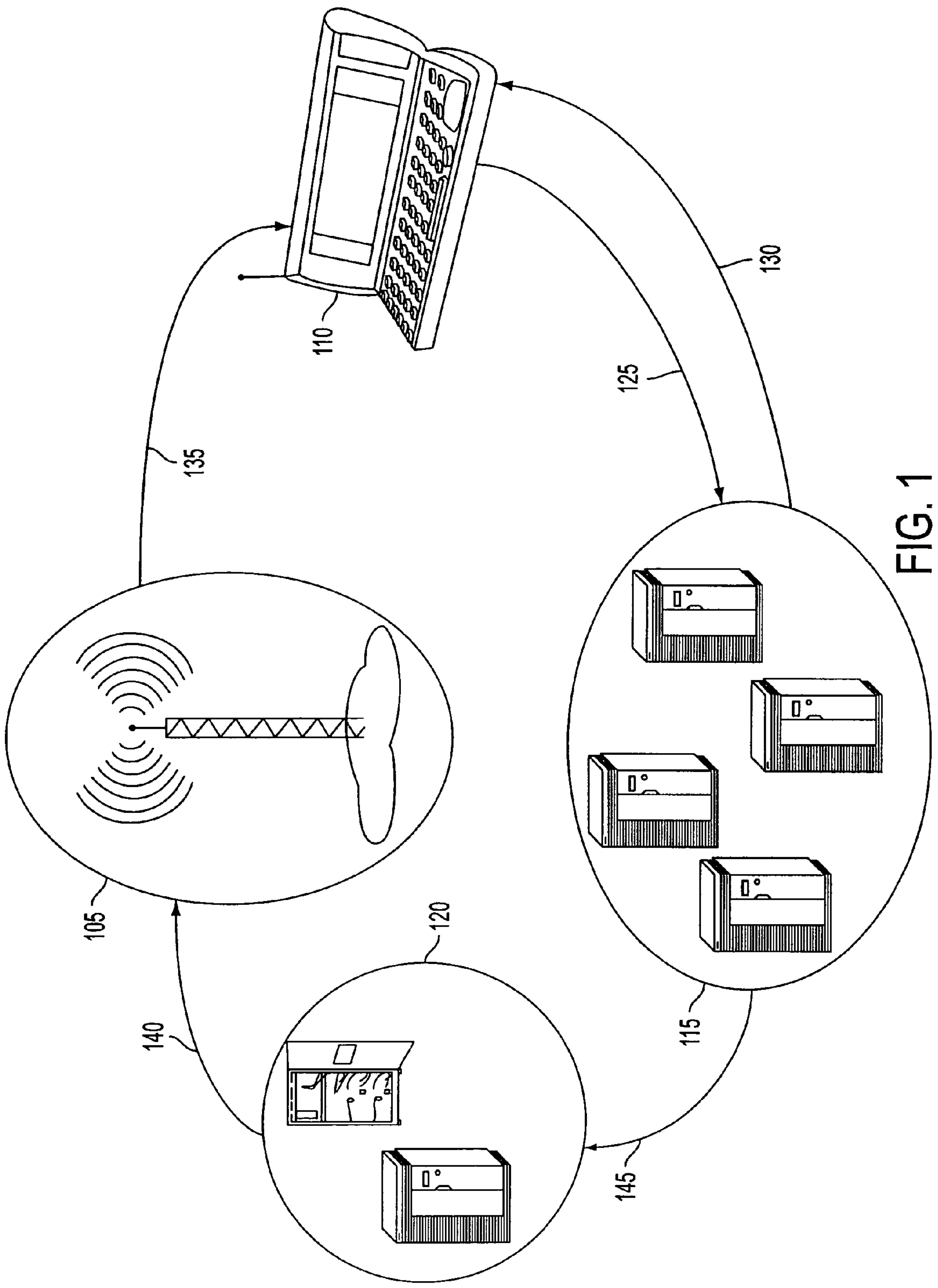
FIG. 1 depicts a two-way communication system based on RDS data stream broadcasting and the integration of a digital mobile terminal and VHF/FM radio receiver according to one embodiment of the present invention.

FIG. 1 depicts the interaction between an FM radio network 105 that transmits an RDS data stream 135, a digital mobile terminal 110, mobile internet services platform 115, and a FM radio broadcasting server platform 120 according to one embodiment of the present invention. Digital mobile terminal 110 includes an FM radio receiver and includes software that captures relevant links and addresses from the RDS data stream. The RDS datastream can for example contain links to WWW-, SMS-, WAP-, and I-mode based value-added services, such as news, entertainment, and e-commerce or even just a phone number. Henceforth, these services are referred as mobile internet services through the whole of this document. Digital mobile terminal 110 saves and displays the captured mobile internet services address. If the subscriber/user selects the mobile internet services address, the result is a request 125 for that service. That is, the digital mobile terminal 110 is connected to mobile internet services platform 115, which results in mobile internet services platform 1 15 providing a response 130 to digital mobile terminal 110.

For example, if a Web URL is transmitted in the RDS data stream in connection with a radio broadcast, a user of the digital mobile terminal can request further information or services by selecting the displayed URL on the digital mobile terminal. One example might be a URL for an advertiser's Web site that is transmitted in the RDS data stream in connection with an audio advertisement broadcast over an FM radio network.

On the server side, FM radio network 105 is supplied with broadcasting information and data 140 from FM radio broadcasting server platform 120. FM radio broadcasting server platform 120 receives provisioning information and data 145 from mobile internet services platform 115 comprising SMS numbers, WAP addresses and URLs, for example.

The client side (digital mobile terminal) is a system comprising a plurality of subsystems. The subsystem handles all aspects of the RDS data stream and may comprise at least one module and is best understood when discussed and described as a plurality of functional modules. The subsystem as a whole handles the interfaces and interactions between the digital mobile terminal and the FM radio network in the context of the RDS data stream, the interfaces and interactions between the digital mobile terminal and the mobile internet services platform and the interfaces and interactions between the digital mobile terminal and a user/subscriber seeking to access and interact with mobile internet services.

Similarly, the server side (FM radio broadcasting server platform) may comprise a plurality of subsystems. The subsystem that handles all aspects of the RDS data stream may include at least one module and is best understood when described and discussed as a plurality of functional modules. The subsystem as a whole handles the interfaces and interactions between the FM radio broadcasting server platform and the FM radio network in the context of the RDS data stream and the interfaces and interactions between the FM radio broadcasting server platform and the mobile internet services platform.

Figure 2:
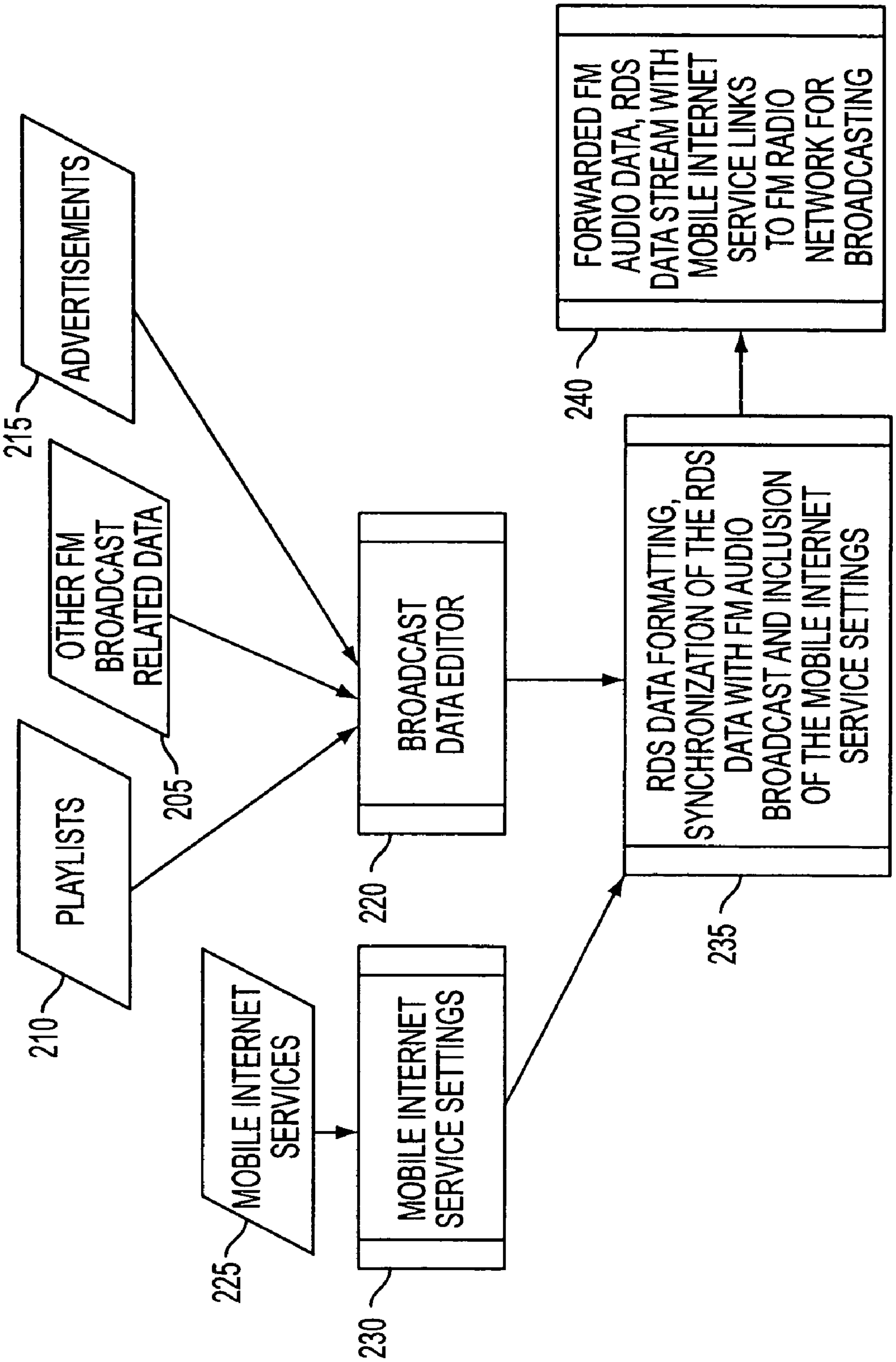
FIG. 2 is a block diagram of the high-level functionality of the server side software broken down into exemplary modules.

Referring to FIG. 2, information and data 140 that is broadcast may include broadcasting related information, playlists, and advertisements, for example. This information is edited by a broadcasting editor. Playlists 210, advertisements 215 and other FM broadcasting related data 205, for example, are submitted to broadcasting data editor module 220. Mobile internet services data 225 are submitted to a module 230 for the addition and adjustment of the mobile internet service settings. These service settings are the standard settings that are needed when using e.g. WAP-based service. The settings are sent to digital mobile terminal 110 via RDS and stored in a buffer and when the user selects a service, the settings are immediately available, so the service can be utilized immediately. In WAP the necessary settings are: access point (home page URL, remote access server number, user name and password, WAP gateway IP address, data call type and data call speed), URL, user name and password. In WWW the necessary settings are only URL, etc. Edited broadcast data and mobile internet service settings are then forwarded to a module 235 that performs RDS data formatting, synchronization of the RDS data stream with the FM audio broadcast and inclusion of the mobile internet service settings with the RDS data stream and FM audio broadcast. This combination of data (RDS data stream with mobile internet service settings and FM audio broadcast signal) is forwarded by module 240 to the FM radio network for broadcasting.

Figure 3:
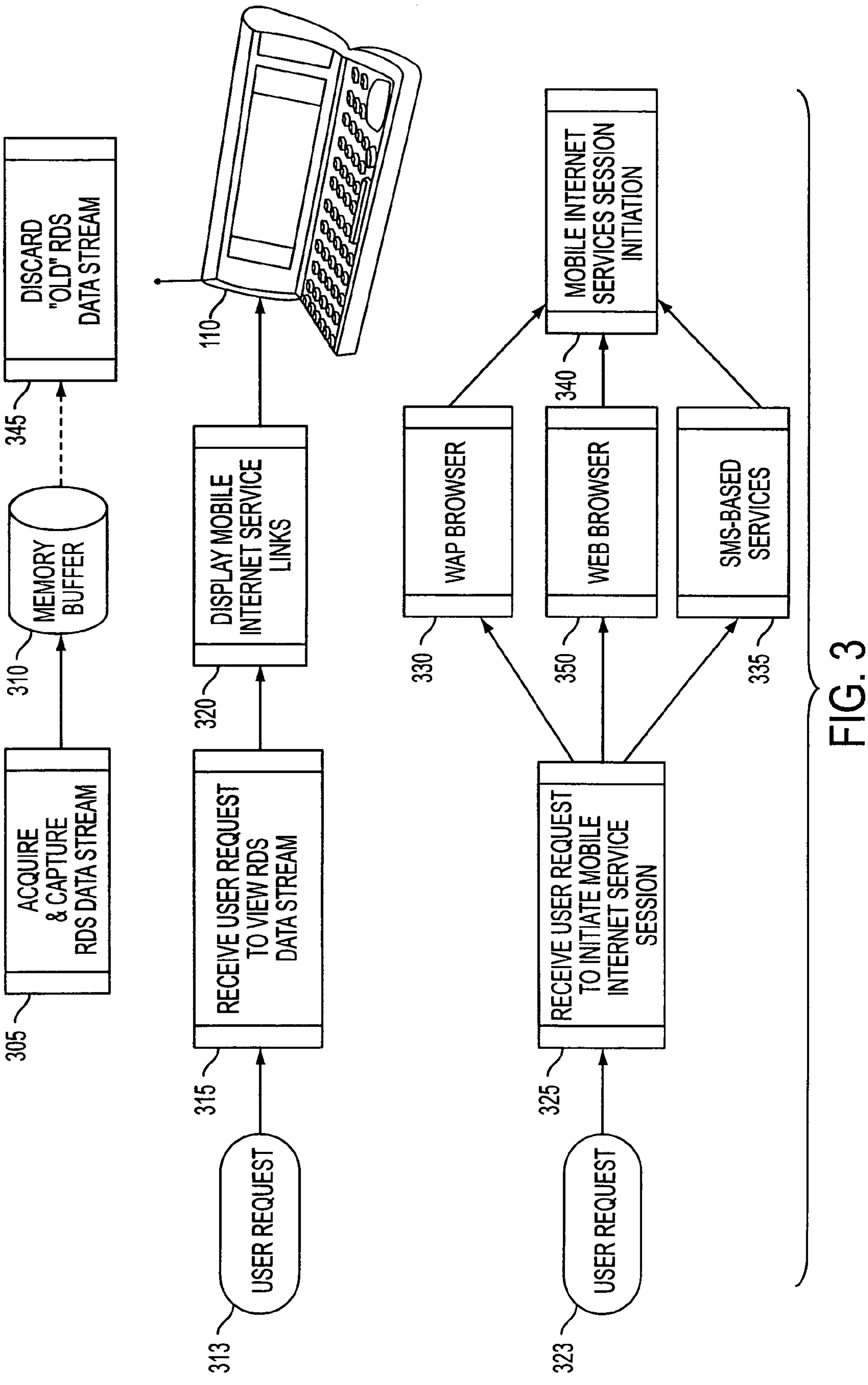
FIG. 3 is a block diagram of the high-level functionality of the client side (digital mobile terminal) software broken down into exemplary modules.

FIG. 3 depicts exemplary client side (digital mobile terminal side) modules used to capture and use the broadcast mobile internet services settings embedded within the FM audio broadcast and RDS data stream. Module 305 acquires and captures the RDS data stream and forwards the captured RDS data stream to memory buffer 310 in the digital mobile terminal. The RDS data stream is retained in memory buffer 310 for a period of time, for example 30 seconds. After the defined time period has expired, a timeout occurs and the "old" RDS data stream in the memory buffer 310 is discarded, erased or overwritten by module 345.

Module 315 receives subscriber/user requests 313 to view the captured RDS data stream and forwards the user/subscriber requests to module 320 to display the mobile internet service links including the captured RDS data stream on the user/subscriber's digital mobile terminal 110. Module 325 receives user/subscriber requests 323 to initiate a mobile internet services session and makes a selection of either WAP browser module 330 or SMS-based services module 335 or Web browser module 350 based on the service settings included in the RDS data stream. WAP browser module 330 automatically extracts WAP settings from the captured RDS data stream. SMS-based services module 335 includes an SMS editor to edit the SMS services number and commands that are automatically extracted from the captured RDS data stream. These commands are used to order some services: (e.g., In Finland there are several SMS services where you send a command, e.g., "weather Helsinki" to a certain phone number and you receive the weather forecast for Helsinki). Both WAP browser module 330 and SMS-based services module 335 forward connection information to mobile internet session initiation module 340, which establishes and maintains a connection between the digital mobile terminal and the mobile internet services platform and establishes and maintains a session between the digital mobile terminal and the mobile internet service platform.

Figure 4:
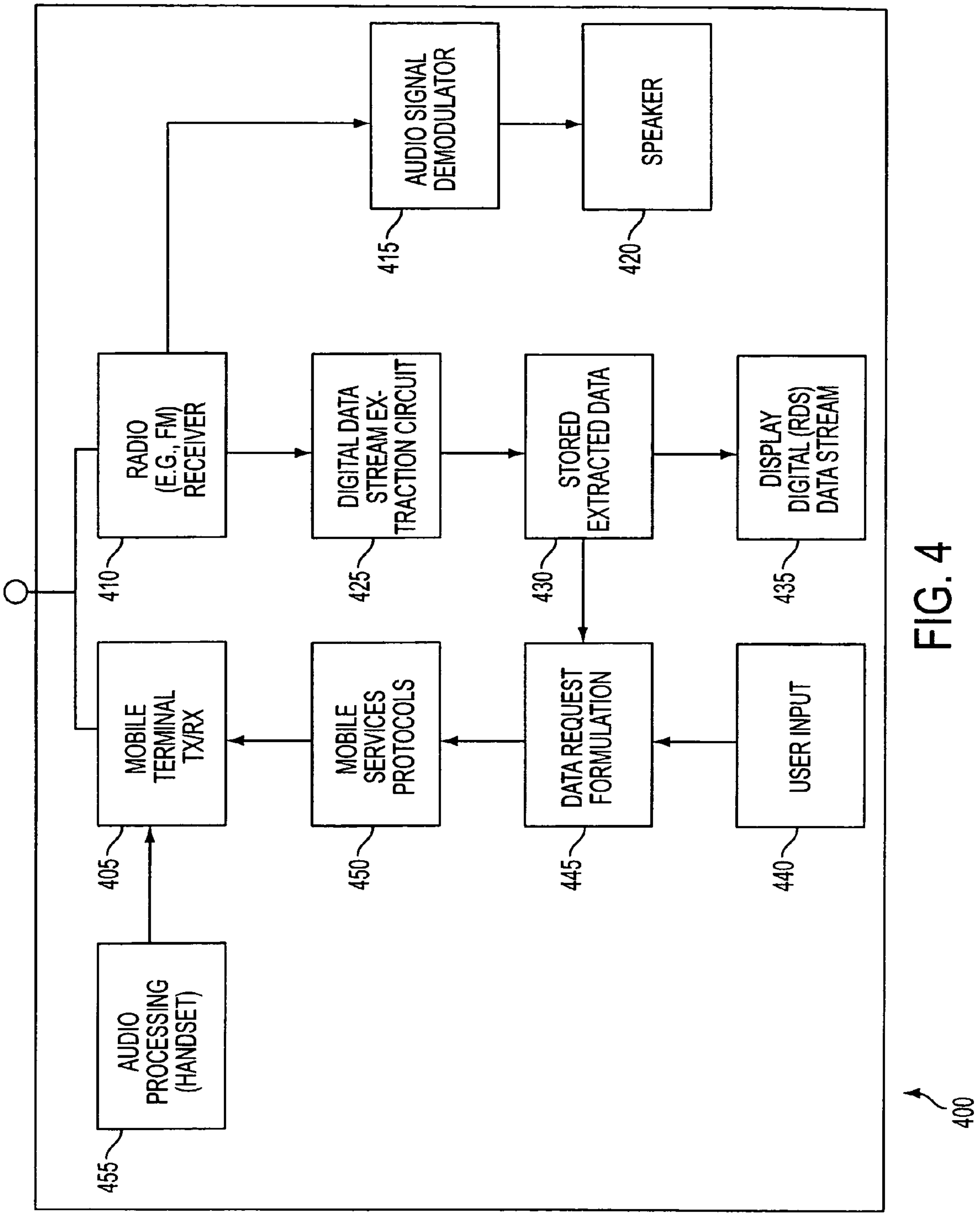
FIG. 4 is a block diagram of a digital mobile terminal according to one embodiment of the present invention.

FIG. 4 is a block diagram of a digital mobile terminal 400 according to one embodiment of the present invention. A digital mobile terminal may include a mobile terminal circuit 405 that provides mobile transmission and reception services using a mobile terminal network and a radio receiver 410 that receives a broadcast radio signal. The mobile terminal circuit 405 interfaces with a user via an audio processing circuit 455. The radio receiver forwards the received radio broadcast to an audio signal demodulator 415 that demodulates an audio portion of a received radio broadcast and provides the demodulated audio portion to a speaker 420 incorporated into the digital mobile terminal.

The radio receiver 410 also forwards the received radio broadcast to a digital data stream extraction circuit 425 that extracts a digital data item from a digital data stream (e.g., RDS data stream) transmitted in conjunction with the radio broadcast. The digital data extraction circuit forwards the extracted digital data item to a memory buffer 430 for storage. The stored digital data item is forwarded to a display device 435 for display on the digital mobile terminal.

The digital mobile terminal may also include a user input device 440 that permits a user of the digital mobile terminal to select the extracted digital data item displayed on the display device 435 to interact with the digital data item stored in the memory buffer 435 and a processor 445 programmed with instructions that, upon selection of the extracted digital data item displayed on the display device, causes a service request to be transmitted through the mobile terminal circuit 405 on the basis of the extracted digital data item. The processor further interacts with a mobile services protocol circuit 450 in order to invoke the corresponding/proper protocol for use with the displayed digital data item.

Figure 5:
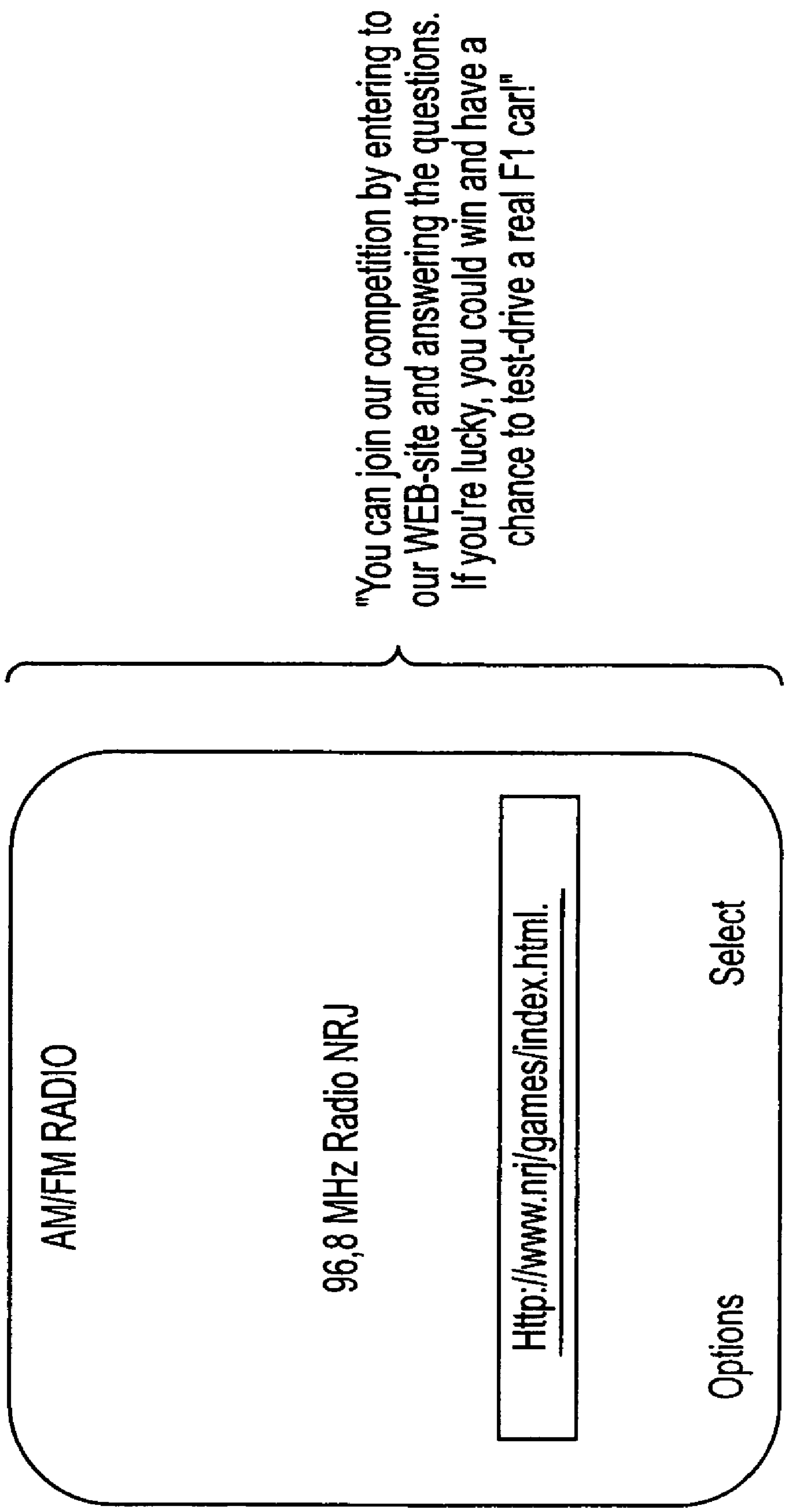
FIG. 5 is an exemplary embodiment of a digital mobile terminal display.

FIG. 5 is an exemplary embodiment of a digital mobile terminal display. According to this embodiment, there could be "on-line" links that can be acquired while listening to a program. The links can be presented to a user as actual links or the link could be whatever type of banner or link is broadcast.

Figure 6:
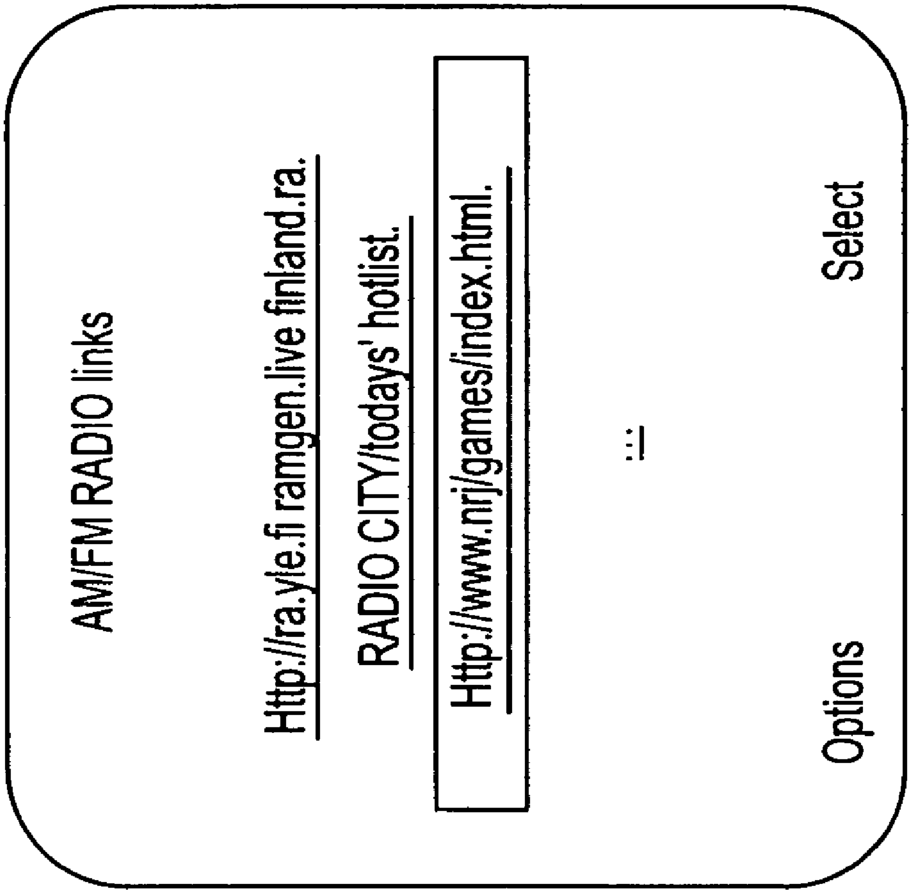
FIG. 6 is another exemplary embodiment of a digital mobile terminal display.

FIG. 6 is another exemplary embodiment of a digital mobile terminal display. According to this embodiment, there may be several links stored in the memory buffer of the digital mobile terminal (the number of links able to be displayed depends on the size of the memory buffer in the digital mobile terminal) and a user can (even when not listening to a radio broadcast anymore) choose any of the links still stored in the memory buffer and connect to the offered service. The links can be of any type. In this example, the first and third links are WWW-based and the second link is SMS-based. Whenever a user selects any type of a link, the related service settings stored in the memory buffer of the digital mobile terminal are activated and connection between the digital mobile terminal and the service platform is established using proper connection.

While the digital mobile terminal has been described in terms of its component circuits, it should be noted that any or all of these circuits may be implemented in software or hardware or any combination thereof, including but not limited to Application Specific Integrated Circuits (ASICs) or Field Programmable Gate Arrays (FPGAs) or any equivalent technology.

While the modules described above have been described in terms of software, the modules could also be implemented in Application Specific Integrated Circuits (ASICs) or Field Programmable Gate Arrays (FPGAs) or any other equivalent device. The present invention is described in terms of FM radio broadcasts but AM radio broadcasts, TV or any other transmission technologies are within the scope of the present invention. An FM RDS data stream is merely one example of the present invention. Any other type of computer readable data embedded with instructions is within the scope of the present invention. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. An apparatus comprising:
- a radio receiver integrated in said apparatus, said radio receiver configured to receive a radio broadcast; and
- a processor to execute computer readable instructions stored in a memory, said computer readable instructions performing the steps of:
  - capturing a digital data stream transmitted as part of the radio broadcast, wherein a service link is embedded within said digital data stream;
  - storing said service link in a memory buffer;
  - displaying information relating to said service link on a display of said apparatus; and
  - removing said information from said display upon expiration of a predefined period of time,
- wherein said service link includes information usable by said apparatus to interact with a mobile service platform corresponding to said service link.

2. The apparatus of claim 1, wherein said service link information comprises service description information relating to an Internet URL.

3. The apparatus of claim 1, wherein said service link information comprises service description information relating to a WAP link.

4. The apparatus of claim 1, wherein said service link information comprises service description information relating to an email address.

5. The apparatus of claim 1, wherein said service link information comprises service description information relating to a telephone number.

6. The apparatus of claim 1, wherein said computer readable instructions further comprise instructions to perform the steps of:
- accepting a user request to initiate a service session based on said service link, based on service description information included in said digital data stream; and
- establishing a connection between said apparatus and said mobile service platform.

7. The apparatus of claim 6, wherein said computer readable instructions further comprise instructions to perform the step of requesting content from said mobile service platform upon establishment of the connection between said apparatus and said mobile service platform.

8. A computer readable medium encoded with instructions capable of being executed by a computer for receiving service link data via a digital data stream:
- capturing the digital data stream transmitted as part of a radio broadcast,
- detecting a service link embedded within said digital data stream;

storing said service link in a memory buffer;

displaying information relating to said service link on a display of a digital radio terminal performing said method; and removing said information from said display upon expiration of a predefined period of time, wherein said service link includes information for providing said digital radio terminal sufficient information to initiate contact with a mobile service platform corresponding to said service link.

9. The computer readable medium of claim 8, wherein said service link information comprises an Internet URL.

10. The computer readable medium of claim 8, wherein said service link information comprises a WAP link.

11. The computer readable medium of claim 8, wherein said service link information comprises an email address.

12. The computer readable medium of claim 8, wherein said service link information comprises a telephone number.

13. The computer readable medium of claim 8, wherein said instructions further comprise:

accepting a user request to initiate a service session based on said service link; and based on the accepting step, establishing a connection between said digital radio terminal and said mobile service platform.

14. The computer readable medium of claim 13, wherein said method further comprises requesting content from said mobile service platform upon establishment of the connection between said digital radio terminal and said mobile service platform.

15. A method comprising:

capturing a digital data stream transmitted as part of a radio broadcast, detecting a service link embedded within said digital data stream;

storing said service link in a memory buffer of a mobile terminal;

displaying information relating to said service link on a display of the mobile terminal performing said method; and removing said information from said display upon expiration of a predefined period of time, wherein said service link includes information for providing said mobile terminal sufficient information to initiate contact with a mobile service platform corresponding to said service link.

16. The method of claim 15, wherein said service link information comprises an Internet URL.

17. The method of claim 15, wherein said service link information comprises a WAP link.

18. The method of claim 15, wherein said service link information comprises an email address.

19. The method of claim 15, wherein said service link information comprises a telephone number.

20. The method of claim 15, further comprising the steps of:

accepting a user request to initiate a service session based on said service link; and based on the accepting step, establishing a connection between said digital radio terminal and said mobile service platform.

21. The method of claim 20, further comprising the step of requesting content from said mobile service platform upon establishment of the connection between said mobile terminal and said mobile service platform.

22. A mobile terminal, comprising:

a processor controlling overall operation of the mobile terminal;

an integrated radio receiver configured to receive a radio broadcast, said radio broadcast including an audio portion and a Radio Data Stream (RDS) portion, said RDS portion embedding text data corresponding to a contemporarily transmitted audio portion of the radio broadcast; and memory storing computer readable instructions that, when executed by the processor, cause the mobile terminal to perform a method comprising storing in a first memory buffer a first text value received as part of the RDS portion;

responsive to a user request, retrieving the first text value from the first memory buffer and displaying the first text value on a display of said mobile terminal; and removing said first text value from said display upon expiration of a predefined period of time, wherein said first text value provides said mobile terminal sufficient information to initiate interaction with a mobile service platform corresponding to said first text value.

23. The mobile terminal of claim 22, wherein said first text value comprises an Internet URL.

24. The mobile terminal of claim 22, wherein said first text value comprises a WAP link.

25. The mobile terminal of claim 22, wherein said first text value comprises an email address.

26. The mobile terminal of claim 22, wherein said first text value comprises a telephone number.

27. The mobile terminal of claim 22, wherein the computer readable instructions further comprising the step of, responsive to a user request to initiate a service session based on the first text value, establishing a connection between said mobile terminal and said mobile service platform.

28. The mobile terminal of claim 27, wherein the computer readable instructions further comprising the step of requesting content from said mobile service platform upon establishment of the connection between said mobile terminal and said mobile service platform.

* * * * *